Patented Apr. 11, 1939

2,153,841

UNITED STATES PATENT OFFICE 2,153,841

PRESERVATION OF PAINT

Lindley E. Mills, Midland, Mich., assignor to The Dow Chemical Company, Midland, Mich., a corporation of Michigan No Drawing. Application September 11, 1937, Serial No. 163,472

3 Claims. (Cl. 134—39)

This invention concerns the preservation of oil-base paints and varnishes. It is more particularly concerned with the protection of coating films thereof from decomposition and staining caused by fungous growths.

Paints and varnishes containing oily vehicles, gums, or resins of animal or vegetable origin are subject to attack by various fungous and bacterial organisms following application to exposed surfaces. Such attack results in the eventual failure of the paint or varnish film. Frequently the oily-base, or filler, is consumed by the organism, while in other cases the hydrogen ion concentration of the film is sufficiently changed, due to the presence of metabolic by-products of the attacking organism, to cause fading and change in chemical composition of the paint pigment Perhaps the most common difficulty arising from the attack of paints and varnishes by various micro-organisms, and particularly molds, is the discoloration of painted surfaces by accumulations of mycelia and spores thereon. Not only does such accumulation of growth disfigure the paint coating, but frequently spores and mycelia work under the paint film through abrasions and cracks therein, causing the dried film to scale, and in the case of wooden surfaces, producing dry rot and other deterioration of the wood structure underneath. In dairies, packing houses, etc., where conditions of high humidity and temperature accelerate a prolific growth of mycelia and spore-forming organisms upon painted surfaces, the obnoxious and musty odors arising therefrom have been found sufficient to taint milk, butter, and similar food products processed in proximity thereto.

A number of fungicidal agents have been suggested for inclusion in oil-base paints and varnishes to prevent mold-growth. Certain of such agents react with oils and pigments, causing discoloration or fading thereof. Others act as anti-oxidants and anti-siccatives, thereby slowing down the drying rate of the paint or varnish and causing surfaces coated therewith to remain tacky over relatively long periods of time. The effect produced by many such preservatives is transitory, since they vaporize, sublime, or are otherwise dissipated out of the composition upon weathering. Other fungicidal compounds are decomposed by light and air, causing premature discoloration of the paint or varnish supposedly protected therewith.

Among the objects of this invention is to provide a method for the preservation of oil-base paints and varnishes, which will (1) give relatively permanent protection for films thereof against fungous and bacterial attack and decomposition, and (2) serve as means for protecting the wood directly beneath the paint or varnish film from deterioration. A further object is to provide a composition consisting of an oil-base paint or varnish having a preservative material dissolved or otherwise dispersed therein, which will not support the growth of spores or mycelia of air-borne organisms. A further object is to provide a preservative adapted to be incorporated into oil-base paints and varnishes which (1) will prevent the growth thereon of molds and other micro-organisms without at the same time slowing down or otherwise affecting the drying characteristics of such coating composition, (2) will exercise a permanent preserving effect upon such coating composition, (3) will not itself undergo excessive discoloration upon exposure to light, (4) will not accelerate the discoloration of paint pigment upon weathering, and (5) will be sufficiently soluble in the paint or varnish that it may be incorporated therein during manufacture, and thereafter stored without the separation of the preservative by precipitation, crystallization, or otherwise.

I have discovered that pentachlorophenol is adapted to serve as a superior paint and varnish preservative and can be incorporated with such oil-base coating compositions in amounts up to 5 per cent by weight thereof without affecting the rate of drying of such compositions, causing them to undergo excessive discoloration or fading upon weathering, or increasing their sensitivity to light. The pentachlorophenol can be dissolved in the oily constituents or ground with the pigment prior to or during the formulation of the coating composition, or may be dissolved therein immediately prior to application.

The amount of pentachlorophenol required to exert a fungicidal action in paint and varnish preparations is dependent upon the temperature and humidity to which films thereof are to be exposed. While amounts thereof ranging between 0.1 and 5.0 per cent by weight can advantageously be incorporated with various coating compositions, I have found that from about 1 to about 2.5 per cent by weight is generally sufficient to prevent mold growth completely on and in the applied film, and to inhibit the attack by molds or termites of wood surfaces coated therewith.

Among the common organisms which attack films of oil-base coating compositions and against which pentachlorophenol has been found effective are *Aspergillus niger, Aspergillus flavus, Aspergillus fumigatus, Penicillium glaucum, Penicillium italicum, Fomes anosus, Ceratostomella pilifera,* mixtures of fermentation and putrefaction bacteria, etc.

Pentachlorophenol has been found satisfactory for use in any coating composition comprising oily constituents capable of dissolving from 1 to 2 per cent by weight thereof. Among the compositions which can be so preserved are those commonly termed dammar and alkyd resin, phenol resinate, resin oil, short oil mill white, long oil, short oil, slow drying oil, hard enamel, interior enamel, flat paint and gloss paint types and varnish compositions containing gums and resins of animal and vegetable origin. The use of this preservative is particularly desirable in highly colored barn and house paint where fungous attack results in a rapid fading and decoloration of dried films thereof. The following formulae are representative of compositions resistant to fungous attack:

*Composition 1*

| | Parts by weight |
|---|---|
| Carbonate white lead | 43.4 |
| Zinc oxide | 21.7 |
| Raw linseed oil | 28.5 |
| Turpentine | 3.2 |
| Japan drier | 3.2 |
| Pentachlorophenol | 2.0 |

*Composition 2*

| | | |
|---|---|---|
| White lead paste (8% oil) | pounds | 100 |
| Raw linseed oil | gallons | 4 |
| Turpentine | gallon | 0.12 |
| Drier | do | 0.12 |
| Pentachlorophenol | pounds | 3.3 |

*Composition 3*

| | Parts by weight |
|---|---|
| Pigment | 65 |
| White lead, zinc oxide, titanox, inert silicates. | |
| Tung oil | 31.5 |
| Turpentine and drier | 3.5 |
| Pentachlorophenol | 1.5 |

*Composition 4*

| | Parts by weight |
|---|---|
| Grinders dark chrome green | 12 |
| Siliceous inerts | 48 |
| Raw linseed oil | 36 |
| Turpentine and drier | 4 |
| Pentachlorophenol | 2.5 |

*Composition 5*

| | Parts by weight |
|---|---|
| Natural mineral brown oxide | 60 |
| Raw linseed oil | 36 |
| Turpentine and drier | 4 |
| Pentachlorophenol | 1.25 |

*Composition 6*

| | | |
|---|---|---|
| Basic carbonate white lead paste (8% oil) | pounds | 100 |
| Raw linseed oil | gallons | 1.5 |
| Soy bean oil | do | 2.5 |
| Turpentine and drier | gallon | 0.25 |
| Pentachlorophenol | pounds | 3.75 |

Other modes of applying the principle of my invention may be employed instead of those explained, change being made as regards the materials or their amounts employed, provided the compositions stated by any of the following claims or their equivalent be employed.

I therefore particularly point out and distinctly claim as my invention:

1. A coating composition comprising a drying oil as the major vehicle and pentachlorophenol in amount sufficient to serve as a fungicide and preservative.

2. A coating composition comprising a drying oil as the major vehicle and from 1 to 2.5 per cent by weight of pentachlorophenol.

3. A paint comprising a drying oil as the major vehicle and pentachlorophenol in amount sufficient to serve as a fungicide and preservative.

LINDLEY E. MILLS.